United States Patent

Matsui et al.

[19]

[11] Patent Number: 6,091,566
[45] Date of Patent: Jul. 18, 2000

[54] MAGNETORESISTIVE HEAD AND HARD DRIVE SYSTEM HAVING OFFSETS FROM CENTER OF THE SERVO AREA TO MINIMIZE MICROJOGGING

[75] Inventors: Takao Matsui, Yamato; Kenji Ogasawara, Fujisawa, both of Japan

[73] Assignee: International Business Machines Corporation, Armonk, N.Y.

[21] Appl. No.: 08/444,664

[22] Filed: May 19, 1995

[30] Foreign Application Priority Data

May 23, 1994 [JP] Japan .................................. 6-108762

[51] Int. Cl.[7] .................................................. G11B 5/596
[52] U.S. Cl. ..................................... 360/77.04; 360/77.08
[58] Field of Search ................................... 360/66, 77.08,
360/78.14, 103, 113, 77.04, 51, 75; 369/54,
275.3, 44.2; 395/441, 800

[56] References Cited

U.S. PATENT DOCUMENTS

| | | | |
|---|---|---|---|
| 5,436,773 | 7/1995 | Hanson | 360/66 |
| 5,459,853 | 10/1995 | Best et al. | 395/441 |
| 5,483,402 | 1/1996 | Batra | 360/113 |

FOREIGN PATENT DOCUMENTS

| | | |
|---|---|---|
| 479703 | 4/1992 | European Pat. Off. . |
| 3187073 | 8/1991 | Japan . |
| 6139734 | 4/1994 | Japan . |
| 6139733 | 5/1994 | Japan . |

*Primary Examiner*—Paul Loomis
*Assistant Examiner*—James L Habermehl
*Attorney, Agent, or Firm*—Karuna Ojanen

[57] ABSTRACT

A magnetoresistive (MR) reproduction element is positioned during data recording, data reproduction, and formatting so that its total range of movement is 3/2 times a range of movement (microjogging) from the location of the reproduction element in data recording to the location of the reproduction element in data reproduction. The total range of movement is centered within a range where the detection of positional error of the reproduction element changes linearly. Therefore, in the respective data recording, data reproduction and formatting processes, microjogging is performed and the detection of positional error changes linearly for each of an off-track $OF_W$ in data recording, an off-track $OF_R$ in data reproduction, and an off-track $OF_F$ in formatting. Accordingly, the characteristics of the MR reproduction element can be effectively used to a maximum degree and information can be reproduced without being undetected or erroneously detected.

9 Claims, 9 Drawing Sheets

MAGNETORESISTIVE HEAD AND HARD DRIVE SYSTEM HAVING OFFSETS FROM CENTER OF THE SERVO AREA TO MINIMIZE MICROJOGGING

BACKGROUND OF THE INVENTION

1. Field of the Invention

The present invention generally relates to a servo method for a magnetoresistive (MR) head and to a hard disk system and, more particularly, to a servo method for positioning an MR head when information is reproduced by using the MR head and to a bard disk system provided with MR heads.

2. Description of the Related Art

As an information recording medium designed to record an enormous amount of information used in computers and the like, a hard disk drive (hereinafter, HDD) has been put to practical use. Such an HDD has been provided with a plurality of magnetic recording disks (hereinafter, disks). Reproduction and recording heads (hereinafter, magnetic heads) have been positioned on the desired tracks respectively determined on disks so that information has been recorded on disks or information has been reproduced from disks.

In these HDDs, rotary actuators using voice coil motors (hereinafter, VCMs) have been widely used for positioning magnetic heads at the prescribed positions over disks since they are light, operate at high speed, and are cheap to manufacture. This type of rotary actuator has a rotation axis outside the disk and turns the magnetic head arranged at its end onto the disk so that the magnetic head is positioned at a prescribed location on the disk. A servo system involves a sector servo system in which a pattern, a cylinder number, or a sector number necessary for position control each sector on the surface of each disk is recorded and which is extensively employed, especially for small HDDs.

With the recent increase in types of processing by computers and the like, the manufacturing of large-capacity HDDs has grown. To promote the manufacture of large-capacity HDDs, much work has gone into making compact reproduction and recording heads to be positioned over desired tracks of disks. Such a magnetic head for recording and reproducing information is often a magnetoresistive (MR) head.

This MR head is typically provided with a reproduction element and a recording element which are independent. The reproduction element is a MR element having magnetoresistance. The recording element is an inductive film head. The MR element is, as well known, an element having magnetoresistance (called MR) by which electrical resistance changes due to a magnetic field and magnetization, and can detect a magnetic field near the MR element. This MR element needs a bias magnetic field to improve the linearity of sensitivity and changing magnetic field upon detection of the magnetic field based on the change in a resistance value. As general methods for obtaining this bias magnetic field, such methods as shunt bias and soft bias are used.

In case where information is recorded or reproduced with a disk employing an MR head, a servo control to position the MR head, in other words, a servo control (called microjogging) for positioning the MR head at an optimum location is needed corresponding to the time at which reproduction and recording are done when the MR head is to be positioned above reproduction and recording media and the like.

For example, when the MR head is installed on a rotary actuator HDD, the MR element and recording element sometimes do not pass the same track location. Generally speaking, the track width of the recording element is larger than that of the reproduction element (MR element). Since the MR element is spaced a prescribed distance from the recording element, sometimes either the MR element or the recording element does not pass the same track because of the angle of skew and the difference in position between the MR element and the recording element in accordance with the turning of the rotary actuator, in prescribed different locations on the disk (for example, the location of a track near the inmost edge of the disk and the position of a track near the outmost edge of the disk) by turning the rotary actuator. Therefore, it is necessary to change the position of the magnetic head so that such processing as the recording and reproducing of information and the like with the disk can be done wherever the location may be on the disk.

Primary processing such as recording and reproducing information and the like with the disk includes data recording, data reproduction, and formatting. That is, according to a general sector servo system as shown in FIG. 9, the following areas are included on at least one track: servo areas 50 where servo information SERVO such as a cylinder number, a position control pattern, and the like is stored; ID areas 54 where sector information ID recorded at format control or thereafter; and data areas 56 where data information DATA is stored. Therefore, data recording processes for reproducing data information are done. For data reproduction, data reproduction processes for reproducing data information are done. For formatting, processes to record the sector information ID are done to record and reproduce data.

Consequently, in accordance with the sector servo system, it is essential that the sector information ID be rewritten at any time for the purpose of stopping the use of a defective sector, and that data information be reproduced immediately before processes without distinguishing between processes to record and reproduce data information. An example of processes to record and reproduce information and the like with the disk by using the MR head are described below.

As FIG. 9(A) shows, a magnetic head 20 for recording and reproducing information with a disk comprises a recording element 19 and a reproduction element 21 (MR element). Since data recording processes are important to stably obtain data information, data information DATA is recorded by the recording element 19 so that the center of the reproduction element 21 is located (following called on-tracking) in the center (location on the center line $C_L$ in FIG. 9) of the servo area 50 to stabilize the servo control. For data reproduction (FIG. 9(B)), data information DATA recorded is reproduced by moving the reproduction element 21 so that the center of the reproduction element 21 is near the center (location on the center line $C_M$ in FIG. 9) of the data area 56 where data information DATA is recorded. Formatting (FIG. 9(C)) records sector information ID in the ID area 54. With these processes, it is necessary that the recorded sector information ID should be reproduced in each data reproduction and recording process. Therefore, in formatting, the sector information ID is recorded in the ID area 54 so that the center (location on the center line $C_F$ in FIG. 9) of the recording element 19 is located in the center (near the intermediate location between the location on the center line $C_L$ in FIG. 9 and the location on the center line $C_M$ in FIG. 9) between the location of the reproduction element 21 positioned in data recording and the location of the reproduction element 21 in data reproduction. In this way, various types of information can be recorded and reproduced from the information recording disk.

To increase the capacity of HDDs as noted above, the track width is assumed decreased. However, in the case of HDDs in which the track width is to decrease, a problem arises in that the percentage of undetected or erroneously detected information (called the error rate) significantly increases (deteriorates) based on how much the MR head is dislocated from the center of a track (called off-track). Namely, while the track width has decreased, the magnetic head has also been miniaturized, so that the track width of the reproduction element as the MR element is also short. Thus, an error rate is affected sharply and sensitively by the amount of off-track which, in the most extreme case, causes tracks or sectors that cannot be reproduced to be produced.

OBJECTS OF THE INVENTION

It is an object of the present invention to provide a servo method for an MR head capable of decreasing to a desired degree information undetected or erroneously detected by the MR head.

It is an another object of the present invention to provide a hard disk system capable of decreasing to a desired degree information undetected or erroneously detected by an MR head of the hard disk system.

These and other objects are achieved by the present invention.

SUMMARY OF THE INVENTION

The information recording disk used in the servo method for the MR head of the present invention is provided with at least one track. This track includes of at least one servo area where servo information for identifying the track location is stored, at least one ID area where sector information for identifying the sector is stored, and at least one data area where data information is recorded or reproduced. The magnetic head is required for the recording and reproducing information from the information recording disk. According to the present invention, the MR head includes a reproduction element having magnetoresistance to which a bias magnetic field is applied and which reproduces information by using magnetoresistance and a recording element for recording information spaced a prescribed distance from the reproduction element.

In a servo method for an MR head according to one aspect of the present invention, as the MR head is positioned with respect to the information recording disk when servo information is reproduced and sector or data information is recorded and reproduced with the information recording disk, the reproduction element is positioned so that it moves with respect to one track within a range equally distant from the center of the track in question. Therefore, even when an MR head comprising a reproduction element and a recording element spaced a prescribed distance apart is used, the dislocation of the reproduction element from the center of the track is not notably larger on one side from the center of the track than on the other side, since the extent of the range where the reproduction element moves is equally distant from the center of the track.

Processing for recording and reproducing information from the information recording disk includes formatting for recording sector information in the ID area, data reproduction for reproducing data information from the data area, and data recording for recording data information in the data area. In formatting and data recording, the recording element and the reproduction element of the MR head are both used. That is, servo or sector information must be reproduced to specify a track or a sector where corresponding information has been recorded.

The MR head is positioned in the data area so that the reproduction element is located in the data area during data reproduction and the recording element is located in the data area during data recording. Since the reproduction element and recording elements of the MR head are separated a prescribed distance, in formatting for recording sector information, the recording element is positioned near the center between the location of the reproduction element positioned at data reproduction and the location of the reproduction element positioned at data recording. Accordingly, locations of the reproduction element at formatting and at data reproduction are locations of maximum movement on both sides of the track. Therefore, if the reproduction element of the MR head is positioned in a range from the location of the reproduction element in formatting (i.e., for recording sector information in the ID area using the recording element) to the location of the reproduction element in data reproduction (i.e., for reproducing data information from the data area using the reproduction element) and each of these locations is equally distant from the center of one track, the amount of dislocation of the reproduction element from the center of the track will not be significantly larger on one side from the center of the track than on the other side.

The present inventors conducted various studies and determined the amount of microjogging of the reproduction element upon data reproduction and recording. They tried a variety of experiments and produced them in definite form as a servo method for an MR head. Stated specifically, they found that a range substantially 3/2 the size of space between the locations of the reproduction element at data reproduction and at data recording could cover the amount of microjogging which the reproduction element can move. It is preferred that the MR head be positioned in a total range substantially 3/2 the size of a range from the location of the reproduction element in data reproduction (i.e., for reproducing data information from the data area using the reproduction element) to the location of the reproduction element in data recording (i.e., for recording data information in the data area using the recording element), wherein the extent of the total range is equally distant from the center of one track.

In another aspect of the present invention, the above-noted servo method for the MR head can be employed in a hard disk system. The hard disk system comprises MR heads respectively including reproduction elements and recording elements. A bias magnetic field is applied to the reproduction elements which are magnetoresistive and which reproduce information by using magnetoresistance. The recording elements are for recording information and are respectively spaced a prescribed distance from reproduction elements. The hard disk system further comprises information recording disks each having at least one track including at least one servo area where servo information for identifying a track location is stored, at least one ID area for storing sector information for identifying the sector, and at least one data area for recording and reproducing data information. The hard disk system still further comprises a positioning means for positioning the reproduction element of the MR head. The positioning means positions the MR head with respect to the information recording when servo information is reproduced and sector or data information is recorded and reproduced relative to the information recording disk, so that the extent of a range where the reproduction element can move relative to one track is equally distant from the center of the track.

Preferably, the positioning means can position the reproduction element of the MR head with respect to the information recording disk so that extent of a range between the location of the reproduction element in formatting (i.e., in which servo information is reproduced and sector information is recorded in the ID area using the recording element with the information recording disk) and the location of the reproduction element in data reproduction (i.e., in which data information is reproduced from the data area using the reproduction element) is equally distant from the center of the one track.

Preferably, the positioning means position the reproduction element of the MR head with respect to the information recording disk in a range 3/2 the size of the range between the location of the reproduction element in data reproduction (i.e., in which servo information is reproduced and data information is reproduced from the data area using the reproduction element with the information recording disk) and the location of the reproduction element in data recording (i.e., in which data information is recorded in the data area using the recording element), wherein the extent of the range is equally distant from the center of the one track.

DESCRIPTION OF THE PREFERRED EMBODIMENT

The present invention is described in more detail by way of an embodiment shown in the accompanying drawings. In the embodiment, the present invention is applied to an hard disk drive (HDD) 10 designed to position magnetic heads with respect to magnetic recording disks (called disks) in accordance with a sector servo method.

Figure 2:
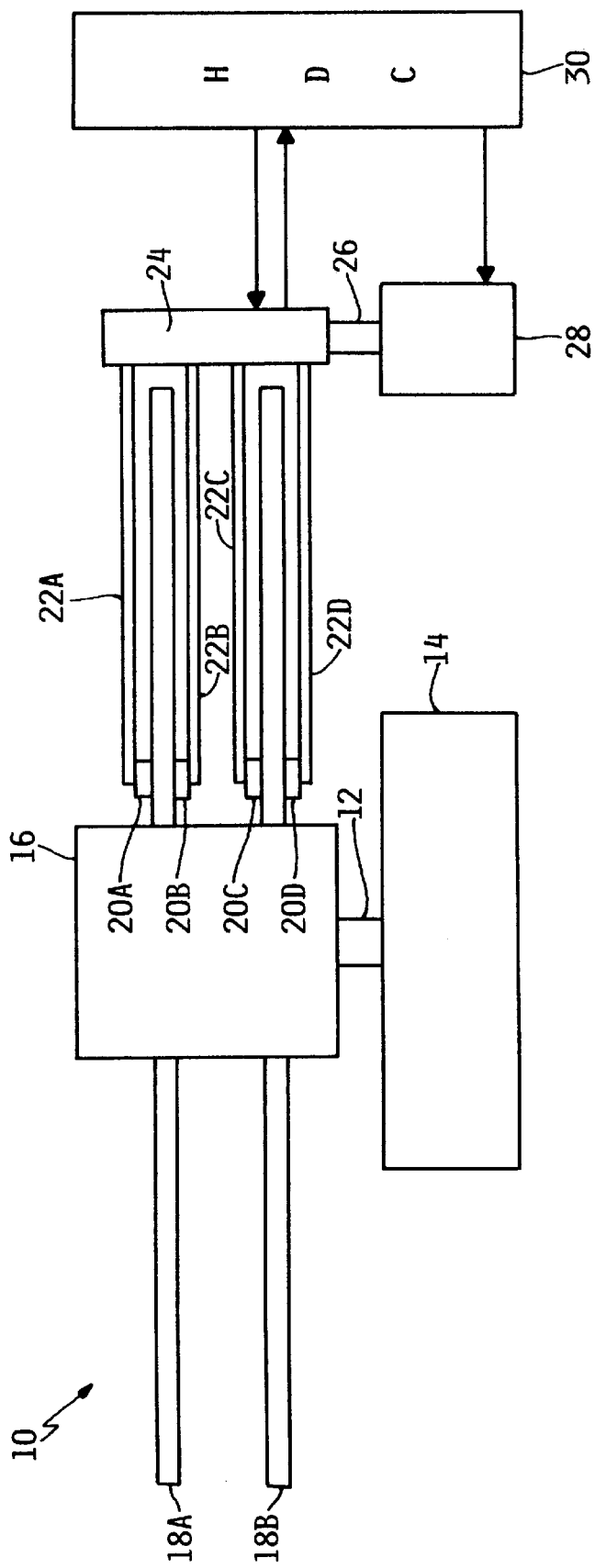
FIG. 2 is a block diagram showing the schematic construction of an HDD to which the present invention is applied.

As FIG. 2 shows, the HDD 10 according to the embodiment is provided with a driver 14 for rotating a shaft 12 at high speed. To the shaft 12, a cylindrical support 16 is attached so that the axes of both members are aligned. A plurality (two in FIG. 2) of disks 18A and 18B as information recording disks are attached to the outer edge of the support 16 spaced a prescribed distance apart. Disks 18A and 18B are designed to have configurations with prescribed thickness dimensions and made of a hard material. Both surfaces of a disk are coated with a magnetic material and used as recording surfaces. A hole whose diameter is substantially the same as the outside diameter of the support 16 is opened at the center of each disk 18A and 18B. The support 16 is inserted into holes of disks 18A and 18B so that disks 18A and 18B are fixed to the outer edge of the support 16. Therefore, when the shaft 12 is rotated by the driver 14, disks 18A and 18B are rotated together with the support 16 as a unitary component.

Figure 3:
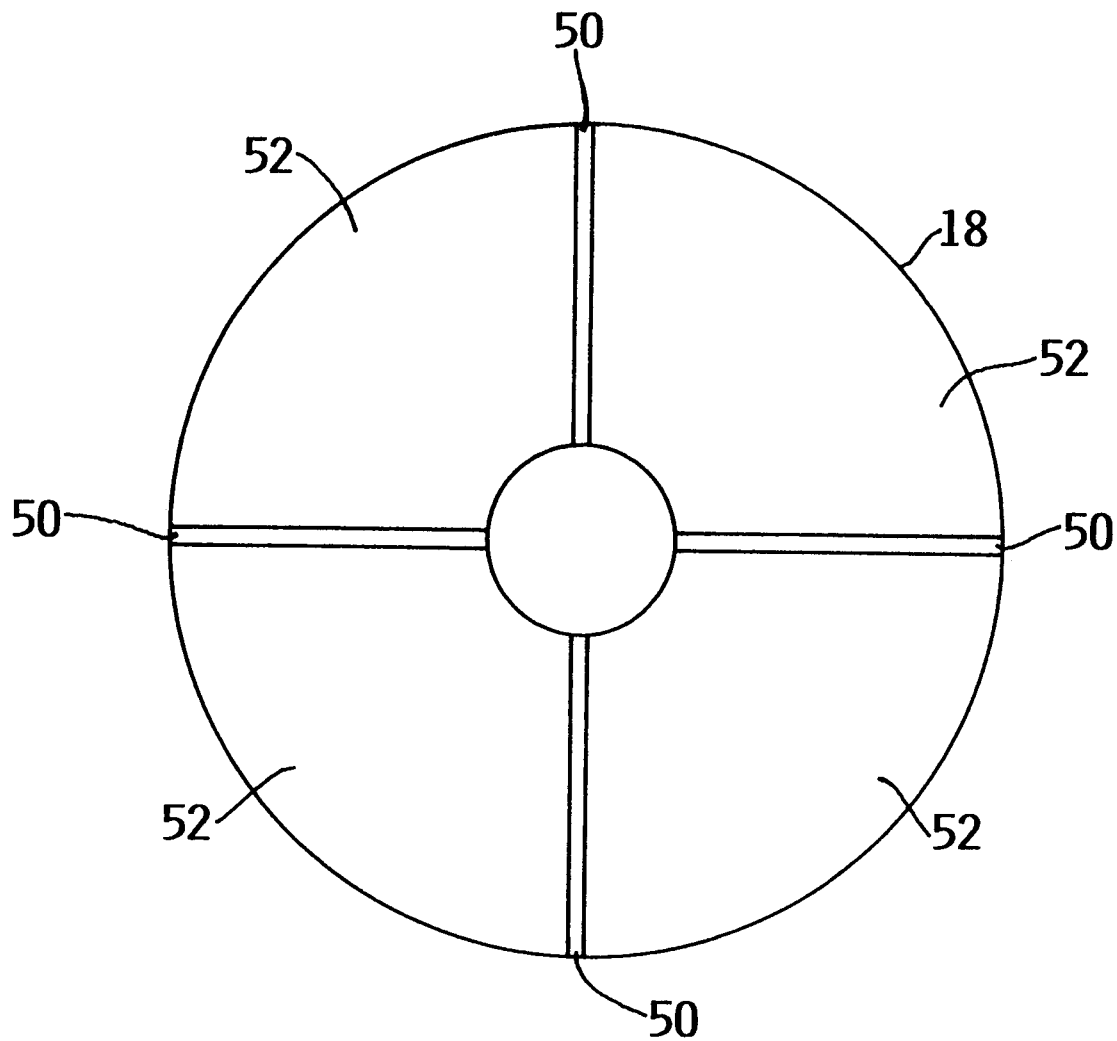
FIG. 3 is a plan view of a disk of the HDD shown in FIG. 2.

As shown in FIG. 3, a plurality of servo areas 50 is formed radially on each of the recording surfaces of disks 18A and 18B in the radial directions of the disk 18. The rest of the recording surface of the disk is designed to be used as data track areas 52. In servo areas 50, servo signals such as burst patterns for indicating the directions of data tracks are recorded. A special code (silence signal area and the like of about 1 microsecond) for displaying the start of the pattern and Gray code (cyclic binary code) for representing the address of each data item and the like are recorded corresponding to the data track. At the terminal end of the servo area 50 in the rotation direction, information to generate a sector pulse signal SP for representing the end of the servo area 50 (showing the start of a sector) is recorded. A plurality of tracks is concentrically formed at a pitch of P in the radial direction in data track areas 52. As mentioned before, each track includes at least one ID area 54 and at least one data area 56. In addition, on each track, information is written in the rotation direction of disks 18A and 18B by magnetic heads, described below.

The above-stated HDD 10 is provided with magnetic heads 20A to 20D which function as MR heads having prescribed head gap widths and gap lengths corresponding to each of the recording surfaces of disks 18A and 18B. Magnetic heads 20A to 20D serve as MR heads and are provided with reproduction elements 21A to 21D for reading information and recording elements 19A to 19D for writing information. Each magnetic head 20A to 20D is attached to the end of each of the corresponding access arms 22A to 22D and held slightly separated (for example, about 0.1 to 0.2 microns) from each of the corresponding recording surfaces of disks 18A and 18B. The rear ends of access arms 22A to 22D are attached to a support 24. The support 24 is installed on a driver 28 through a shaft 26. The driver 28 is rotated by a prescribed angle so that access arms 22A to 22D turn. The turning of access arms 22A to 22H causes magnetic heads 20A to 20D to move in the radially (FIG. 3) on respective recording surfaces of disks 18A and 18B, so that magnetic heads 20A to 20D are positioned at prescribed locations on recording surfaces of disks 18A to 18D.

The driver 28 is connected to a hard disk controller (hereinafter, HDC) 30. This HDC 30 is also connected to magnetic heads 20A to 20D (FIG. 6) as is described below. Access arms 22A to 22D, support 24, shaft 26, driver 28, and HDC 30 comprise the positioning means of the present invention.

Figure 6:
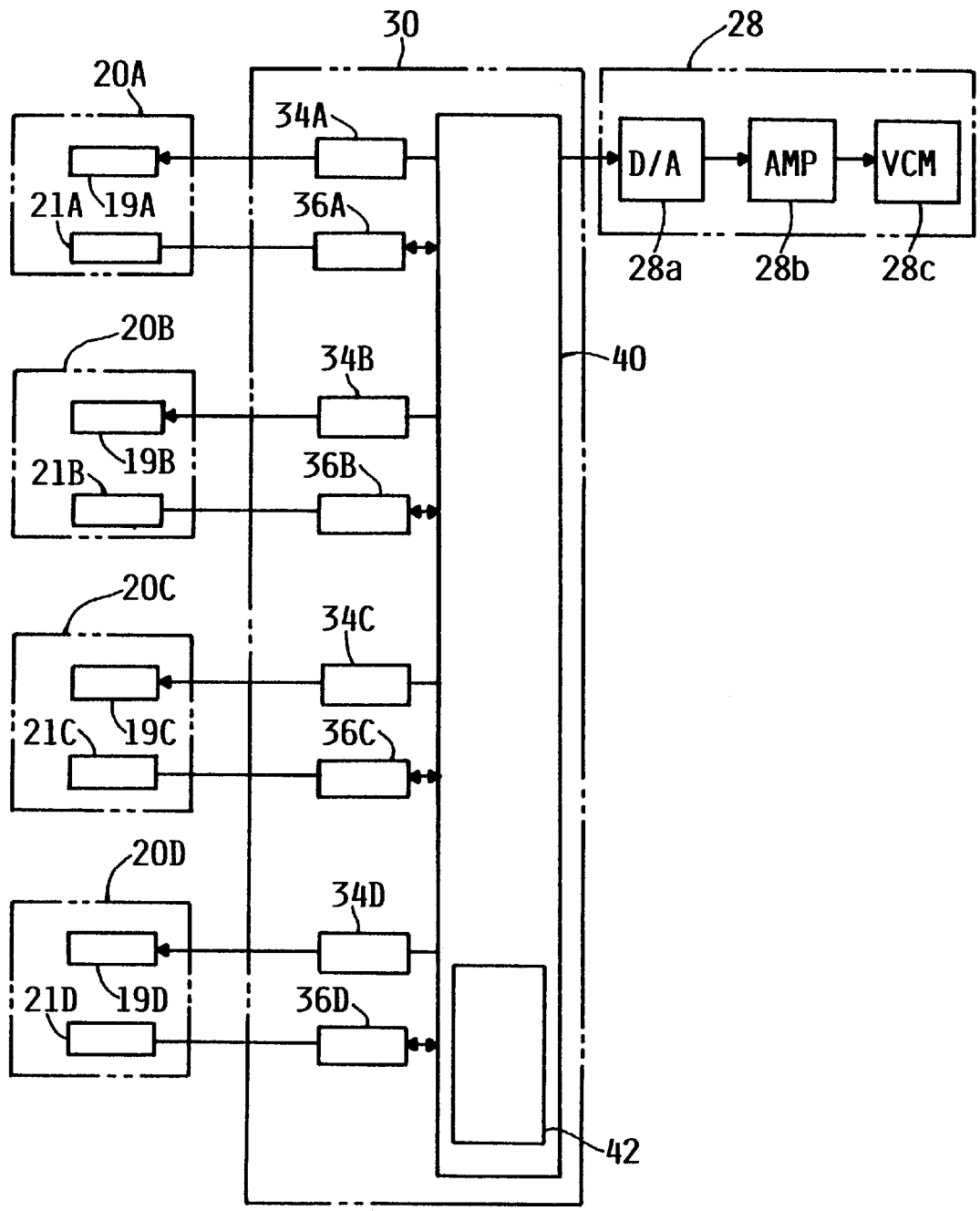
FIG. 6 is a block diagram showing the schematic construction of a hard disk controller of the HDD shown in FIG. 2.

As is seen in FIG. 6, the HDC 30 has a main controller 40 which comprises a microcomputer. This main controller 40 is provided with a map 42, described later, used to determine the amount of microjogging in recording and reproduction with respect to the disk. The main controller 40 is connected to the driver 28 which comprises a digital/analog converter (D/A) 28a, an amplifying circuit (AMP) 28b and VCM 28c. Accordingly, a digital signal output from the main controller 40 is converted to an analog signal in the D/A converter 28a.

The analog signal thus obtained is then amplified with a prescribed multiplying factor in the AMP 28b, and supplied to the VCM 28c. The VCM 28c rotates at a prescribed angle corresponding to the supplied signal and access arms 22A to 22D are also turned at a prescribed angle.

The main controller 40 is connected to the recording element 19A of the magnetic head 20A through a recording driver 34A for supplying a current to record information. The main controller 40 is also connected to the reproduction element 21A of the magnetic head 20A through a reproduction driver 36A for supplying a bias current to detect a magnetic field corresponding to information recorded on the disk and thereby reproduce the information. Similarly, the main controller 40 is connected to recording elements 19B to 19D of magnetic heads 20B to 20D through recording drivers 34B to 34D. The main controller 40 is, likewise, connected to reproduction elements 21B to 21D of magnetic heads 20B to 20D through reproduction drivers 36B to 36D.

Herein, while the magnetic head 20A functions as an MR head, the reproduction element 21A and recording element 19A are formed independently. The recording element 19A is preferably of the well-known sputter-deposited inductive thin film type. The reproduction element 21A, as discussed in detail below, includes one or a plurality of elements having magnetoresistance (called MR) by which electrical resistance changes because of a magnetic field or magnetization. In the embodiment, the reproduction element is adapted to improve the linearity of sensitivity upon detection of the magnetic field near the reproduction element based on the change in resistance by applying a bias magnetic field through the use of soft bias. The structure of magnetic heads 20B to 20D is the same as that of the magnetic head 20A, and therefore detailed explanations of magnetic heads 20B to 20D is omitted.

Figure 4:
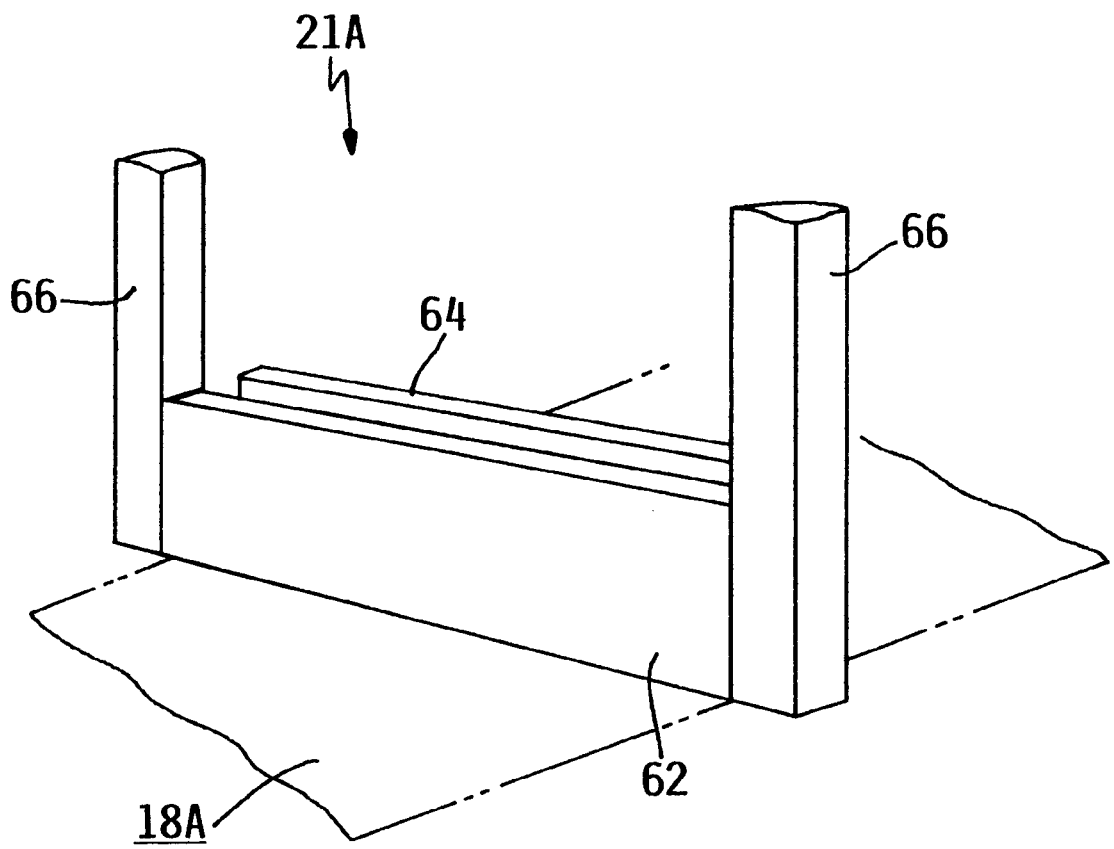
FIG. 4 is a conceptual perspective view of a reproduction element with soft bias of a magnetic head of the HDD shown in FIG. 2.

As shown in FIG. 4, the reproduction element 21A has an MR element 62 in the form of a plate and having MR and a soft magnetic (film) material (soft adjacent layer hereinafter SAL) 64. To both ends of the MR element 62, leads 66 are connected to the HDC 30. The SAL 64 is laminated in parallel with the MR element 62. The SAL 64 and MR element 62 are respectively positioned with respect to the disk 18A so that they are located perpendicular to the disk 18A. Since the SAL 64 is made of a soft magnetic material, it is magnetized by a current provided to the MR element 62. The magnetic field of the thus magnetized SAL 64 causes a bias magnetic field to be applied to the MR element 62.

Figure 5:
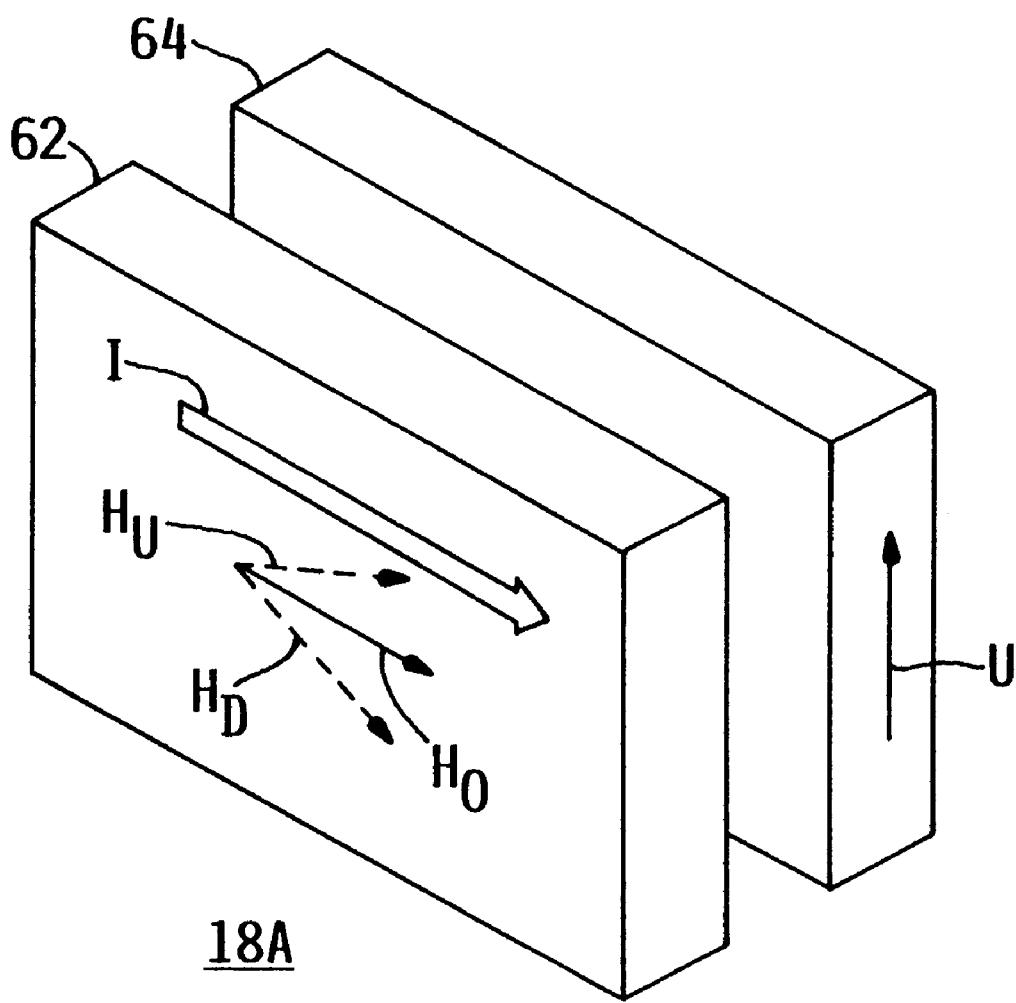
FIG. 5 is a explanatory view for explaining a bias magnetic field in the reproduction element shown in FIG. 4.

As shown in FIG. 5, when current is not supplied to the MR element 62 of the reproduction element 21A, the SAL 64 is not magnetized, as indicated by the orientation of the magnetizing vector (indicated by the arrow $H_o$ in FIG. 5) at manufacture. If a prescribed bias current is supplied to the MR element 62 in a prescribed direction (shown by the arrow I with a void in FIG. 5), a vertical magnetic field of a prescribed direction (shown by the arrow U in FIG. 5) will be generated in the SAL 64 by the prescribed current supplied to the MR element 62. The magnetic field of the SAL 64 is applied to the MR element 62 as a bias magnetic field. The orientation of the magnetizing vector is thus varied (in a direction indicated by the arrow $H_D$ in FIG. 5). In the magnetizing vector with such a direction $H_D$, the magnetization of the MR element 62 shifts vertically by virtue of the vertical component of the magnetic field (corresponding to recorded information) generated from the disk 18A, so that the shift of magnetization under consideration is detected as resistance variations.

Figure 1:
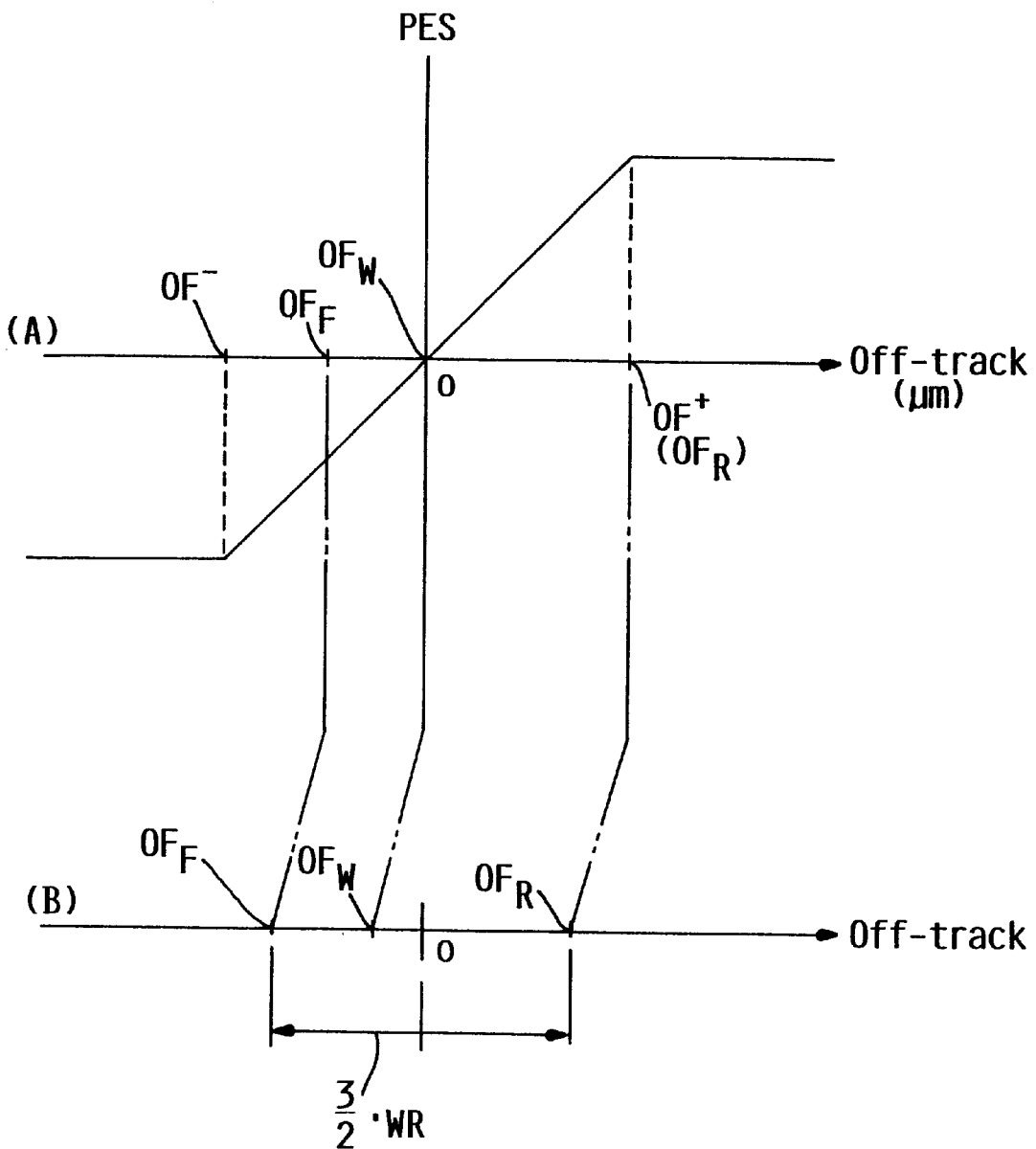
FIG. 1 is a graph showing the relationship between the amount of off-track and the positional error of a magnetic head in a hard disk drive (HDD) to which the present invention is applied.

Turning next to the description of the amount of microjogging of the magnetic head 20A, FIG. 1(A) shows the relationship between the amount of off-track at each position of the reproduction element 21A positioned to a track and a position error signal (hereinafter, PES) that indicates the magnitude of an information reproduction error signal by the reproduction element 21A. As can be understood from FIG. 1(A), the relationship of the PES to the amount of off-track of the reproduction element 21A is such that, when the amount of off-track is 0, the PES is 0, and the PES changes linearly (increases or decreases) within a range from the amount of off-track $OF^+$ positive) when the reproduction element 21A is put off-track to one side, to the amount of off-track $OF^-$ (negative) when the reproduction element 21A is off-track on the other side. Therefore, servo control can be effected within the range where the PES relative to the off-track of the reproduction element 21A linearly increases or deceases. The range of linear change of the PES relative to the amount of off-track corresponds, for example, to the track width of the reproduction element 21A. In other words, the range where the PES relative to the amount of off-track linearly increases or decreases becomes a function of the track width of the reproduction element 21A and the like as parameters. Accordingly, the narrower the track width, the narrower the range. Therefore, if the track width is to be narrowed to increase the capacity of the HDD, the reproduction element 21A will become narrow, thereby narrowing the range where the PES relative to the amount of off-track of the reproduction element linearly increases or decreases.

Figure 7:
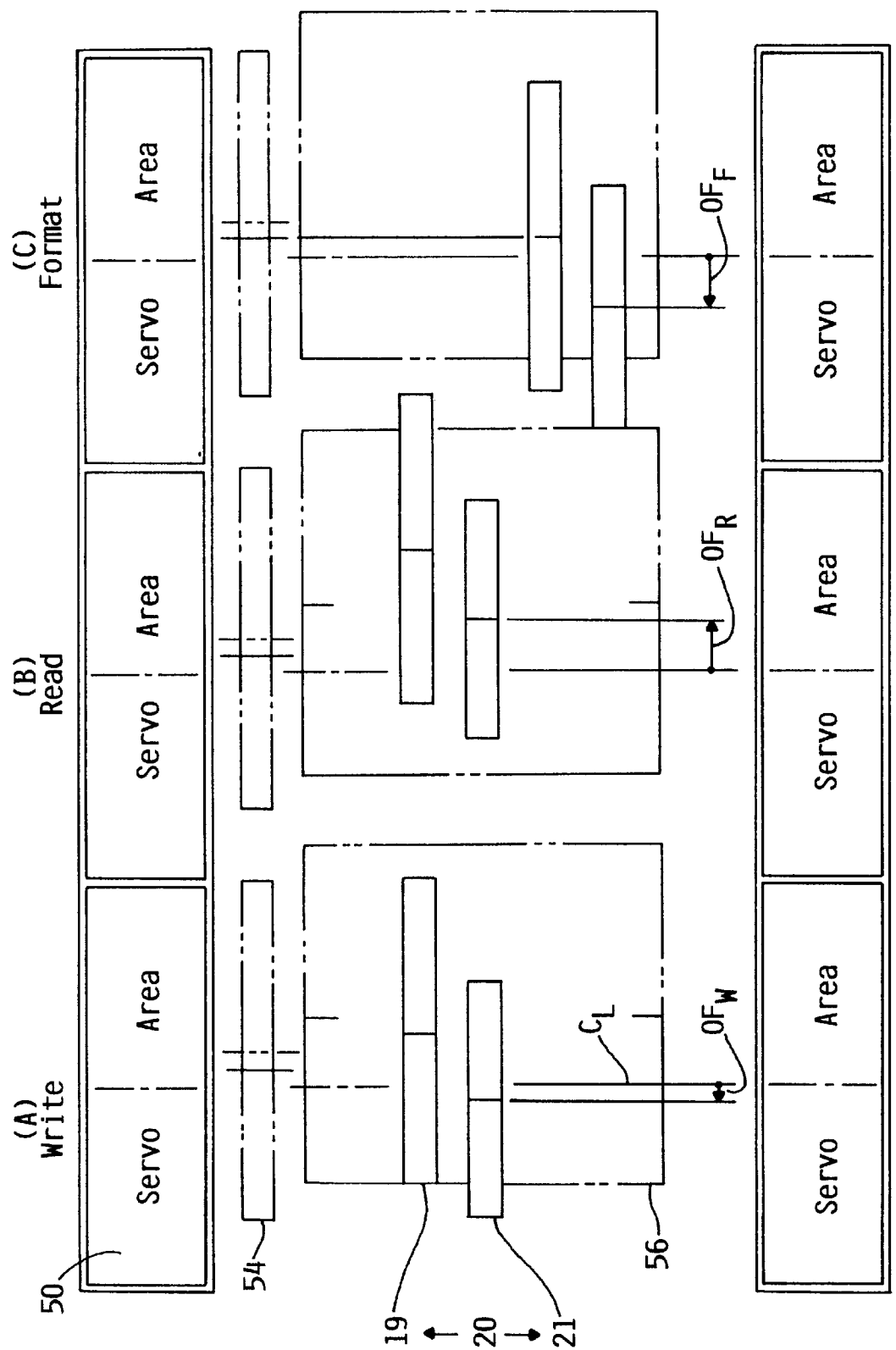
FIG. 7 is a view for explaining the locations of the magnetic head in write, read and format processes of the HDD shown in FIG. 2.
Figure 9:
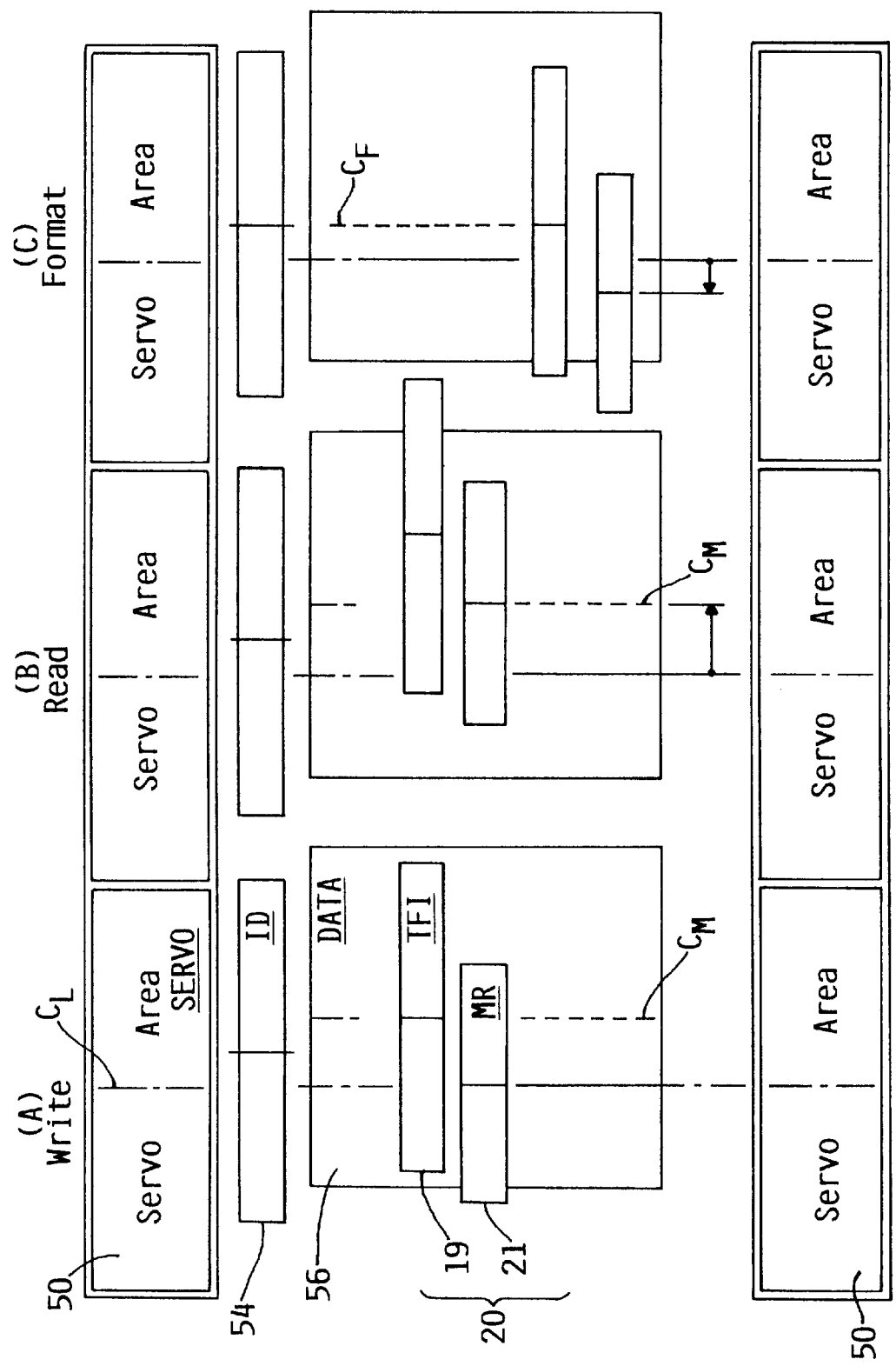
FIG. 9 is a view for explaining the locations of the magnetic head in write, read and format processes of an HDD where data recording is considered as a reference.

Given the above, while data recording for recording data information DATA is set as a reference (FIG. 9(A)) by positioning the center of the reproduction element 21, while following, on a track in the center of the servo area 50 to achieve the most stable servo control as mentioned before, data reproduction and the formatting are also set. As a result, as shown in FIG. 7, the center of the reproduction element 21 is located at the amount of off-track $OF_W$ in data recording, at the amount of off-track $OF_R$ in data reproduction, and at the amount of off-track $OF_F$ in formatting. Therefore, referring back to FIG. 9(A), in data recording, microjogging is not needed. However, in microjogging in data reproduction, the probability that the reproduction element 21A will deviate from this linear range becomes high. For example, when the linear range of the HDD 10 is ±0.9 μm and an area required for microjogging is ±1.2 μm, in the most extreme case, microjogging outside the linear range is needed, so the error rate deteriorates significantly.

Generally, the relationship between the amount of off-track OF of the reproduction element in data recording, in data reproduction, and in formatting is proportional 1:2 between the difference in the amount of off-track of the reproduction element between formatting and data recording (namely, the difference in servo control to position the reproduction element at an optimum location between the respective processes, referred to as the amount of microjogging FW, hereafter), and the difference in the amount of off-track of the reproduction element (referred to as the amount of microjogging WR, hereafter) between data recording and data reproduction.

Given the above, according to the embodiment, the amount of off-track $OF_W$ of the reproduction element in data recording, $OF_R$ in data reproduction, and $OF_F$ in formatting are set (FIG. 1(B)) so that a range 3/2 times the size of microjogging WR is equally distributed from the center of the range where the amount of off-track of the reproduction element linearly increases and decreases. Stated briefly, the setting is determined so that the microjogging is done in each data recording, data reproduction, and formatting.

Therefore, as FIG. 7(A) shows, the reproduction element 21A is located at the amount of off-track $OF_W$ in data recording. Similarly, the reproduction element 21A is located at off-track $OF_R$ in data reproduction (FIG. 7(B)) and at off-track $OF_F$ in formatting (FIG. 7(C)). Consequently, the amount of microjogging is equally allocated from the center of the linear increase or decrease of the amount of off-track of the reproduction element.

Since microjogging WR changes with the structure of individual magnetic heads 20A to 20D and radial directions of disks 18A and 18B in the HDD 10, it can be measured in the test during HDD manufacture or determined by theoretical interpolation. In the embodiment, off-track $OF_W$ of reproduction element in data recording, off-track $OF_R$ in data reproduction, and off-track $OF_F$ in formatting is recorded beforehand as a map 42 (FIG. 6) prepared corresponding to each process so the range 3/2 times the size of microjogging WR is equally distributed from the center of the linear change (increase or decrease) in the amount of off-track. An electrical circuit may be constituted to equally allocate the amount of microjogging from the center of the linear increase/decrease in the amount of off-track under consideration.

Figure 8:
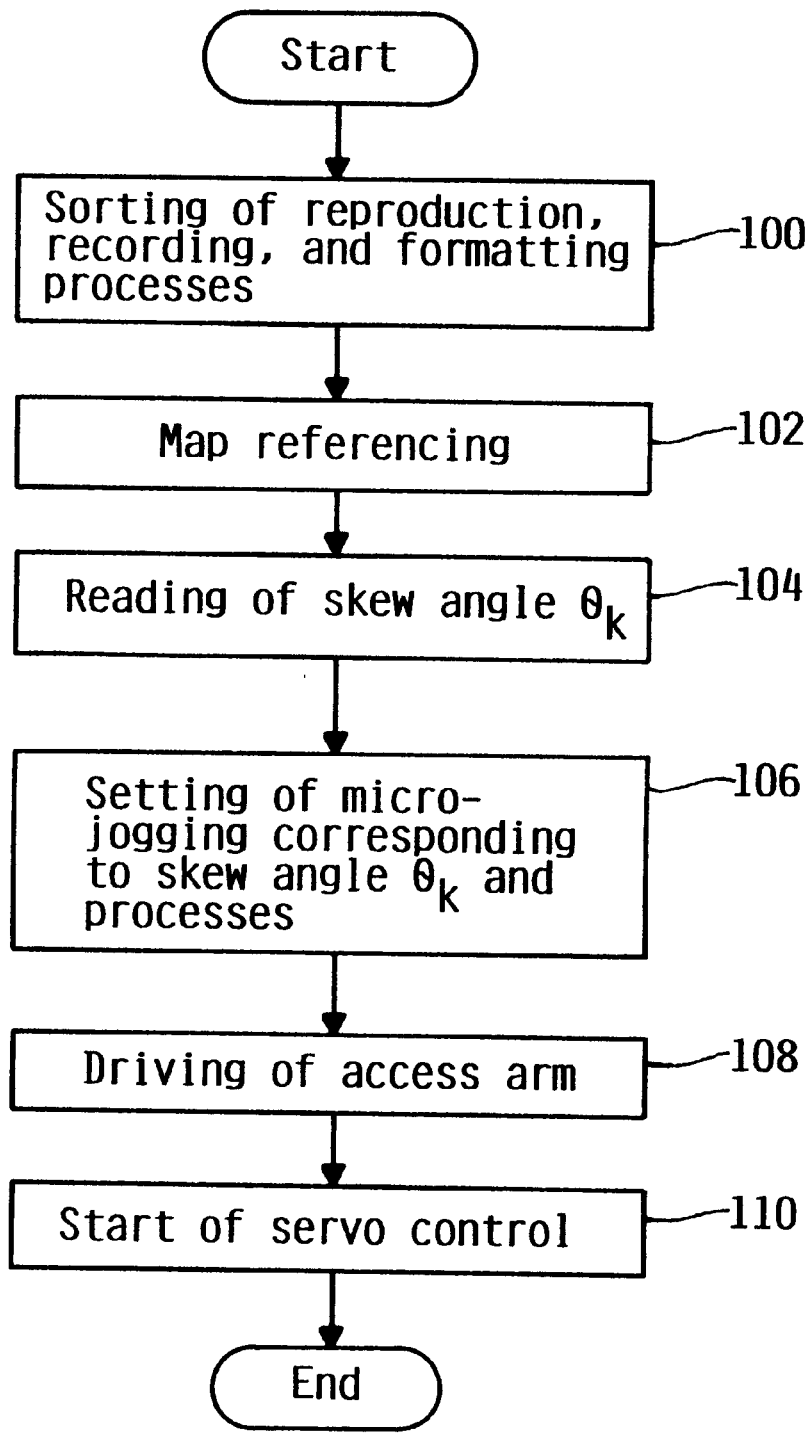
FIG. 8 is a flowchart showing the steps for setting the amount of microjogging.

Referring next to a flowchart of FIG. 8, the operation of the embodiment is further described as follows: In step 100 in FIG. 8, sorting of magnetic head operations with disks 18A and 18B are set. This setting is conducted in any one among data recording, data reproduction, and formatting based on an instruction (command and the like of a user) from a host computer and the like (not shown). In step 102, the map 42 is referenced. Since the amount of microjogging cannot be immediately and simply determined based on the track location and the like, all microjogging (including associations with angle of skew) in processes related thereto is read at this step 102. In step 104, an angle of skew $\Theta_k$ is obtained from the location of the magnetic head 20A to be positioned on the disk 18A upon disk seeking corresponding to an instruction from the host computer (not shown). Therefore, the cylinder number corresponding to the radial direction of the disk may be read, and the angle of skew $\Theta_k$ calculated from the read cylinder number. In addition, the angle of skew can be determined by referencing a predetermined table and the like stored in the HDD 10. In step 106, the amount of microjogging corresponding to the angle of skew $\Theta_k$ thus set and any process among data recording, data reproduction, and formatting as a target is to be set. In step 108, access arms are driven based on microjogging. That is, a digital signal corresponding to the angle of skew and the amount of microjogging is output from the main controller 40 and the signal is converted by the D/A 28a. The converted signal is amplified with a prescribed multiplying factor in the AMP 28b and access arms 22A to 22D are turned a prescribed angle by the VCM 28c based on the amplified signal. In step 110, servo control is started to follow tracks at turned access arms 22A to 22D (FIG. 7) and the present routine ends.

As mentioned above, in the embodiment, the MR head is positioned to correct the error in a reproduction element having the MR effect. The amount of microjogging is distributed within the linear range from off-track when the reproduction element 21A is off-track from the center of the track toward one side to the off-track when the reproduction element 21A at the other side of the center of the track. The characteristic of the reproduction element having the MR effect can be effectively used at its maximum. In addition, since the range where microjogging is enabled may have an allowance in disk reproduction, disk reproduction can be optimized without increasing the load in disk reproduction. Further, information can be reproduced without producing erroneously detected or undetected information.

Although, in the above embodiment, a case where the bias magnetic field is applied to the MR element in accordance with soft bias was described, the present invention is not limited thereto. Further, it should be noted that the bias magnetic field may be applied to the MR element by shunt bias and the like in which a conductor is provided near the MR element and a current is supplied to the conductor so that the magnetic field is applied to the MR element.

Also, although, in the embodiment, a case where the magnetic head is positioned based on the sector servo method was described, the present invention is also applicable to a nonsector method for positioning the magnetic head in which sector areas are not formed on the disk. In this case, while the amount of microjogging differs at the inner edge, intermediate section, and outer edge of the disk, in the present invention, off-track in track location between the reproduction element and recording element can be decreased to reduce microjogging.

According to the present invention, the reproduction element of the MR head is positioned so that it is located and allocated equally from the center of a track. Therefore, since the reproduction element is not extremely biased from the center of track to one side, the amount of off-track of the reproduction element can be effectively controlled within the range where the MR head moves.

Further, the reproduction element of the MR head can be positioned so that a range from the location of the reproduction element during formatting to that of the reproduction element during data reproduction is equally distributed from the center of the track. Therefore, a maximum range of reproduction element movement to be located when recording and reproducing information from the information recording disk can be allocated from the center of the track. In addition, the maximum range of reproduction element movement can be allocated and distributed from the center of the track similarly by positioning the reproduction element so that a range 3/2 times the width of the range from the location of the reproduction element at data reproduction to the location of the reproduction element at data recording process is located equally from the center of the track.

What is claimed is:

1. A method of positioning a magnetoresistive head for reading and writing information from and to a disk, the magnetoresistive head including a magnetoresistive read element and a write element, the write clement being spaced a predetermined distance from the read clement, the disk including at least one track having at least one servo area for stoning servo information for identifying a track location, at least one identification area for storing sector information for identifying a sector, and at least one data area for writing or reading data information, the method comprising the steps of:

(a) obtaining a position error signal from the servo area;

(b) adjusting said position error signal by adding a first offset amount when said write element is writing information on said disk;

(c) adjusting said position error signal by adding a second offset amount when said read element is reading data from said disk, wherein said first and second offsets are non-zero in magnitude and of opposite directions; and (d) positioning said magnetoresistive head on said disk in response to the adjusted position error signal.

2. The method of claim 1, further comprising the step of:

(e) adjusting said position error signal by adding a third offset amount when said disk is being formatted, the third offset correlates to a third position of the read element from the center of the servo area when the disk is being formatted, and the second offset correlates to a second position of the read element from the center of the servo area when data is being read from the disk, wherein the second and third offsets are substantially equal in magnitude and opposite in direction from the center of the servo area.

3. The method of claim 1, wherein the first offset correlates to a first position of the read element when the data is being written to the disk, and the range of motion of the read element is 3/2 times the sum of the magnitudes of the first and second offset centered from the center of the servo area.

4. A method for positioning an magnetoresistive head for reading and writing information from and to a computer disk, the magnetoresistive head including a magnetoresistive read element and a write element spaced a predetermined distance from the read element, the disk including at least one track having at least one servo area for storing servo information for identifying a track location, at least one identification area for storing sector information for identifying a sector, and at least one data area for writing or reading data, the method composing the step of providing a range equidistant from the center of the servo area in which a read element moves during a read, a write, or a format operation on said disk.

5. The method according to claim 4, further comprising the step of establishing said range by:

(a) setting a first offset from the center of the servo area when the read element is positioned in a format operation;

(b) setting a second offset from the center of the servo area when the read element is positioned in a read operation, wherein said first and second offsets have substantially the same non-zero magnitude but are in opposite directions relative to the center.

6. The method according to claim 5, further comprising the step of establishing said range by setting a third offset from the center of the servo area when the read element is positioned in a write operation, and allowing the range of motion of the read element to be 3/2 the sum of the magnitude of the third offset and the magnitude of the second offset centered around the center of the servo area.

7. A hard disk system comprising:

(a) information recording disks each having at least one track including at least one servo area for storing servo information for identifying a track location, at least one identification area for storing sector information for identifying a sector, and at least one data area for writing and reading data;

(b) magnetoresistive heads for reading and writing data from and to said disks, said magnetoresistive heads respectively including magnetoresistive read elements and write elements, said write elements respectively spaced a predetermined distance from said read elements; and (c) positioning means for positioning the read element of said magnetoresistive head such that where said magnetoresistive head is positioned with respect to said data recording disk when said servo information is read and said sector information or data is written and read, a range where said read element can move relative to said track is equally distant from the center of said track.

8. The hard disk system according to claim 7, wherein said positioning means positions said read element in a range between a position of said read element during a formatting process in which said servo information is reproduced and sector information is recorded in said identification area using said write element and a position of said read element during a data read process in which data is read from said data area using said read element extending equally distant from the center of said track.

9. The hard disk system according to claim 7, wherein said positioning means positions the read element of said magnetoresistive head with respect to said information recording disk such that said range is substantially 3/2 times a width from a position of said read element during a data read process in which said servo information is reproduced and data is read from said data area using said read element to a position of said read element during a data recording process in which data information is recorded in said data area using said write element.

* * * * *

UNITED STATES PATENT AND TRADEMARK OFFICE
CERTIFICATE OF CORRECTION

PATENT NO. : 6,091,566
DATED : July 18, 2000
INVENTOR(S) : Takao Matsui and Kenji Ogasawara It is certified that an error appears in the above-identified patent and that said Letters Patent is hereby corrected as shown below:

Claim 1, Col. 10, Line 48, "clement" should be --element--.

Claim 1, Col. 10, Line 49, "clement" should be --element--.

Signed and Sealed this

Twenty-ninth Day of May, 2001

*Attest:*

NICHOLAS P. GODICI

*Attesting Officer*     *Acting Director of the United States Patent and Trademark Office*